US008724139B2

(12) United States Patent
Ishikura

(10) Patent No.: US 8,724,139 B2
(45) Date of Patent: May 13, 2014

(54) ELECTRIC APPARATUS HAVING SEPARATE RECEIVING CAPABILITY FOR OPERATIONAL INSTRUCTIONS AND OPERATIONAL PARAMETERS, RESPECTIVELY, AND SYSTEM INCLUDING THE SAME

(75) Inventor: Kaoru Ishikura, Kyoto (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 805 days.

(21) Appl. No.: 12/384,916

(22) Filed: Apr. 10, 2009

(65) Prior Publication Data
US 2009/0257083 A1 Oct. 15, 2009

(30) Foreign Application Priority Data

Apr. 11, 2008 (JP) ................................. 2008-103803

(51) Int. Cl.
*G06F 3/12* (2006.01)
*H04M 11/00* (2006.01)

(52) U.S. Cl.
USPC ..................... 358/1.15; 358/1.13; 379/102.01

(58) Field of Classification Search
None
See application file for complete search history.

(56) References Cited

U.S. PATENT DOCUMENTS

| 2005/0219605 A1* | 10/2005 | Sato ............................. 358/1.14 |
| 2006/0103666 A1 | 5/2006 | Kita |
| 2006/0120616 A1 | 6/2006 | Kita |
| 2007/0124516 A1* | 5/2007 | Ohara et al. .................... 710/62 |

FOREIGN PATENT DOCUMENTS

| JP | 2001-249780 | 9/2001 |
| JP | 2002-202921 A | 7/2002 |
| JP | 2003-285954 A | 10/2003 |
| JP | 2004-023411 | 1/2004 |
| JP | 2004-070708 A | 3/2004 |
| JP | 2004-112505 A | 4/2004 |
| JP | 2004-221696 | 8/2004 |
| JP | 2004-364002 A | 12/2004 |
| JP | 2006-139186 A | 6/2006 |
| JP | 2006-140898 A | 6/2006 |
| JP | 2007-042015 A | 2/2007 |
| JP | 2007-079693 | 3/2007 |
| JP | 2008-018544 A | 1/2008 |

* cited by examiner

*Primary Examiner* — Thomas Lett
(74) *Attorney, Agent, or Firm* — Edwards Wildman Palmer LLP; David G. Conlin; David A. Tucker

(57) ABSTRACT

An electric apparatus and an electric system comprise: a control panel to accept instructions for operations; and a part to detect and control situations of the operations. The operations, carried out by the electric apparatus and the electric system, are in accordance with the instructions. Furthermore, the electric apparatus and the electric system comprise a remote control to accept instructions about situations and setups of the part. It is configured to accept instructions about the situations and setups of the part, only through the remote control.

19 Claims, 10 Drawing Sheets

FIG. 3

| DATE | COUNTED VALUES BY DRUM COUNTER | COUNTED VALUES BY FEEDING COUNTER | TEMPERATURE OF HALOGEN LAMP HEATER |
|---|---|---|---|
| ○○MONTH○○DAY ○○○○YEAR | ○○○○ | ○○○ | ○○ |
| △△MONTH△△DAY △△△△YEAR | △△△△ | △△△ | △△ |
| ××MONTH××DAY ××YEAR | ×××× | ××× | ×× |
| .. | .. | .. | .. |

FIG. 4

| DATE | IMAGE DENSITY | RESOLUTION OF PRINT ENGINE | TEMPERATURE OF HALOGEN LAMP HEATER |
|---|---|---|---|
| MONTHDAY ***YEAR | ***** | *** | ** |
| ◎◎MONTH◎◎DAY ◎◎◎◎YEAR | ◎◎◎◎ | ◎◎◎ | ◎◎ |
| ◇◇MONTH◇◇DAY ◇◇◇◇YEAR | ◇◇◇◇ | ◇◇◇ | ◇◇ |
| .. | .. | .. | .. |

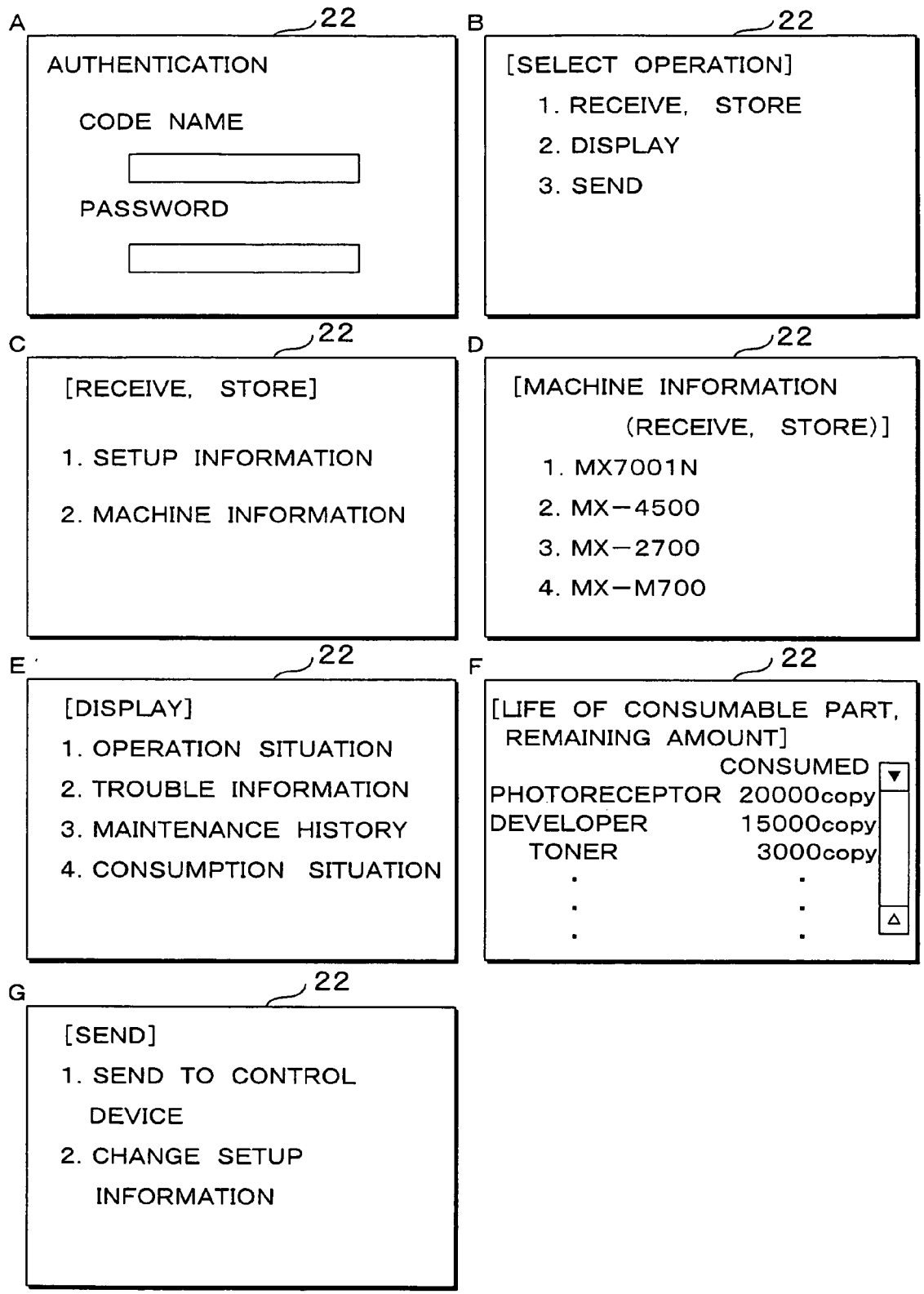

ELECTRIC APPARATUS HAVING SEPARATE RECEIVING CAPABILITY FOR OPERATIONAL INSTRUCTIONS AND OPERATIONAL PARAMETERS, RESPECTIVELY, AND SYSTEM INCLUDING THE SAME

This Nonprovisional application claims priority under 35 U.S.C.§119(a) on Patent Application No. 2008-103803 filed in Japan on Apr. 11, 2008, the entire contents of which are hereby incorporated by reference.

BACKGROUND OF THE INVENTION

1. Field of the Invention

The present invention relates generally to an electric apparatus and an electric system having the electric apparatus and, in particular, to an electric apparatus comprising a part for detecting and controlling operation situations and an electric system having the electric apparatus.

2. Description of Related Art

It is known a service to rent an electric apparatus, such as television, refrigerator, digital multi-function machine carrying out e.g. copy operation, print operation, facsimile operation, and the like, for users in a facility, such as hospital, hotel and the like.

If the rented electric apparatus fails, a maintenance personnel comes to a location of the failed electric apparatus, to maintain/repair it. Thus, it is very important information for the maintenance/repair, what kind of failure has occurred to the electric apparatus and what kind of repair has been made to the electric apparatus, i.e. failure history and repair history.

Japanese Patent Application Laid-Open No. 2004-23411 discloses an image displaying apparatus with a memory that stores a failure history representing previously occurred failures. In the image displaying apparatus, the failure history is displayed on a displaying unit, is sent to an external device, and is read out by the external device, to facilitate access of maintenance personnel to information for maintenance/repair after coming to the location.

SUMMARY OF THE INVENTION

On the other hand, it is known that the rented electric apparatus has so-called unauthorized access problems. For example, a conventional digital multi-function machine is configured to count the numbers of image formation that have been actually performed, specially by counting up an accounts counter of the conventional digital multi-function machine every time when the image formation is performed. Thus, it is known that some users reset (or clear) the accounts counter for unfair purposes, and hurt a renter of the electric apparatus. Furthermore, it is known that some users carry out manipulation attacks to setup values for the image formation about operating situations, such as heater temperature of a fixing unit to fix toner on a paper, movement of a part, rotational speed of a cooling fan, and the like, or about setup values, such as toner density, resolution of print engine, image density, and the like. Therefore, these manipulation attacks then offer disadvantages to next users.

The image displaying apparatus of Japanese Patent Application Laid-Open No. 2004-23411 cannot prevent the unauthorized access problems described above, enough. Furthermore, the image displaying apparatus of Japanese Patent Application Laid-Open No. 2004-23411 internally includes the memory to store the failure history. Thus, the image displaying apparatus of Japanese Patent Application Laid-Open No. 2004-23411 may cause to lose the failure history stored in the memory, when the apparatus fails. In addition, previous attempts to prevent the unauthorized access problems described above for conventional electric apparatuses have met with limited success.

The present invention was made in view of such circumstances, and has a primary object to provide an electric apparatus carrying out operations in accordance with accepted instructions, in which includes: a part to detect and control operation situations; a first accepting unit to accept instructions; and a second accepting unit to accept and send data corresponding to setup for the operations or data corresponding to operation situations of the part, wherein the second accepting unit is a different structure from the first accepting unit. The electric apparatus allows only the second accepting unit to control the setup for the operations e.g. by limiting the usage of the second accepting unit only for a maintaining administrator, but not for users excluding the administrator (such as users having unfair purposes), and removes the disadvantages described above for renters and users.

Another object according to the present invention is to provide an electric system that includes a data storage device for storing data received from the second accepting unit, prepares for loss of data by storing data corresponding to situations of the part in the data storage device, and facilitates management of plural electric apparatuses by storing several data, such as data corresponding to the setup for the operation and by utilizing the several data as so-called maintenance history representing what kind of maintenance has been made.

In the electric apparatus and the electric system according to an aspect of the present invention, for example, a digital multi-function machine carrying out copy operation and print operation arranges: a first accepting unit that accepts instructions for operations of the copy operation or print operation; and a second accepting unit that accepts and sends data corresponding to the setup for the operation (information for margin, line pitch, resolution of print engine, image density, or the like). Therefore, the digital multi-function machine can prevent users having unfair purposes from controlling the setup for the operation, by making the second accepting unit available only for administrators, for example by making only maintenance administrators carry the second accepting unit. In addition, the digital multi-function machine can lead to facilitate management of the machine, by recognizing usage situations of the machine easily.

Furthermore, in the electric apparatus and the electric system according to another aspect of the present invention, a data storage device is arranged to store data received from the second accepting unit. The data storage device can store data corresponding to operating situations of the part. This configuration leads advantages to prepare for loss of the data. The data storage device can store data corresponding to the setup for the operation, too. This configuration leads advantages to facilitate management of the electric apparatus according to the present invention, by utilizing the data corresponding to the setup for the operation as maintenance history, and by confirming usage of the electric apparatus easily, even if there are plural electric apparatuses for management.

The above and further objects and features of the invention will more fully be apparent from the following detailed description with accompanying drawings.

BRIEF DESCRIPTION OF THE DRAWINGS

FIG. 3 is a schematic view showing one example of a received data table.

FIG. 4 is a schematic view showing one example of a sent data table.

FIG. 10 is a schematic view showing several examples displayed on a displaying unit in response to a remote control handled by a maintenance personnel.

DESCRIPTION OF THE PREFERRED EMBODIMENTS

In the following, it will be explained about an electric apparatus according to an aspect of the present invention on the basis of drawings showing embodiments thereof. For illustration purposes, the present invention is described in the context of a digital multi-function machine carrying out copy operation, print operation, facsimile operation, and the like. In addition, for illustration purposes, a "user" means a person who gives instructions to the digital multi-function machine to carry out operations, such as copying, printing, or the like, while an "administrator" means a person who carries out maintenance and management of the digital multi-function machine.

(Embodiment 1)

Figure 1:
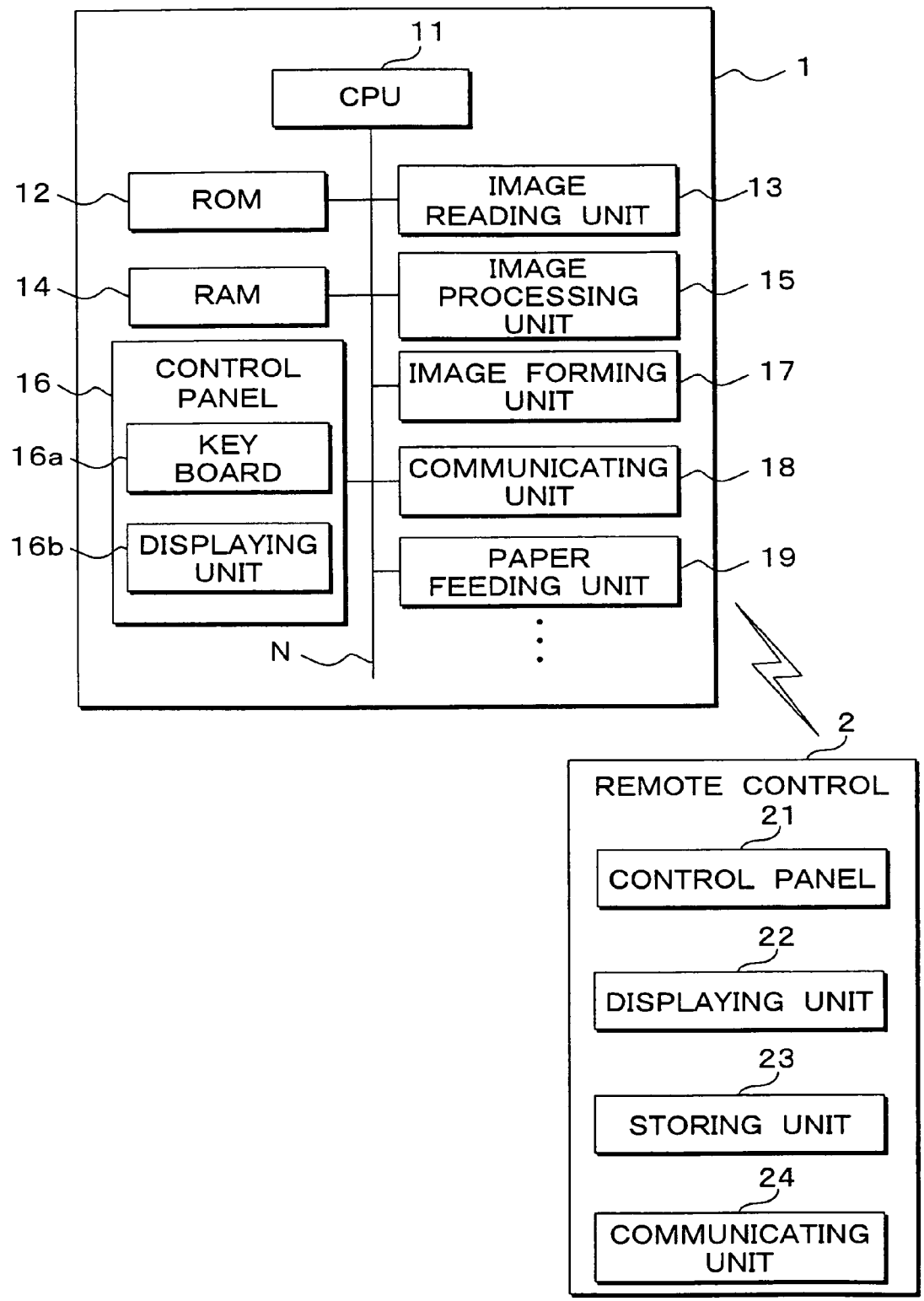
FIG. 1 is a block diagram showing a main structure of a digital multi-function machine in accordance with an embodiment of the present invention.

FIG. 1-5 shows a configuration of the digital multi-function machine according to an aspect of the present invention. FIG. 1 is a block diagram showing a main structure of the digital multi-function machine according to an aspect of the present invention. The digital multi-function machine arranges a main body 1 and a remote control 2 (second accepting unit). The remote control 2 controls the main body 1 remotely.

The main body 1 arranges a CPU 11 and plural hardware, such as ROM 12, RAM 14, control panel 16 (first accepting unit), image reading unit 13, communicating unit 18, image processing unit 15, image forming unit 17, paper feeding unit 19, and the like. The plural hardware is connected to the CPU 11 via a bus N. The ROM 12 stores control programs to control the plural hardware. The CPU 11 properly loads a suitable control program among the control programs stored in the ROM 12, onto the RAM 14, to control operations of the digital multi-function machine.

The image reading unit 13 arranges a light source (not shown) for emitting light onto documents to be read, an image sensor such as charge coupled device (not shown), an AD converter (not shown), and the like. Images of documents positioned at a predetermined position are produced on the image sensor, and then converted into analog electrical signals. The analog electrical signals are converted into digital signals by the AD converter. The digital signals are corrected, in consideration of a light distribution feature of the light source at the time reading images of the documents; uneven sensitivity of the image sensor; and the like, to generate image data in digital manner. The image reading unit 13 sends the generated image data to the image processing unit 15.

The image processing unit 15 arranges application specific integrated circuits to process image data obtained by the image reading unit 13 and print data received by the communicating unit 18. The obtained image data by the image reading unit 13 are configured on the basis of brightness signals outputted by the image sensor. Thus, the obtained image data by the image reading unit 13 are converted into data suitable for print operation. In other words, the obtained image data converted into data that are configured on the basis of density information corresponding to the brightness signals. In addition, the converted data may be corrected for picture quality adjustment: such as contrast; base color density; blur; characteristic of spatial frequency to prevent e.g. degradation of graininess; sharpness to increase reproducibility of character; and the like.

The control panel 16 arranges a key board 16a to accept users' instructions, and a displaying unit 16b to show information for users. The key board 16a arranges several hard keys, such as "switch" key pad to change operation, "start" key pad, numeric key pad, and the like, to accept users' instructions to carry out operations. The displaying unit 16b is a touchscreen with liquid crystal display, to show operating situations of the main body 1, input values by the key board 16a, and the like. In addition, the touchscreen arranges soft keys to select magnification, type of paper to be printed, and the like. Thus, the digital multi-function machine can accept users' instructions for copy operation, print operation, facsimile operation, and the like, through contact of users' finger to the soft keys.

Figure 5:
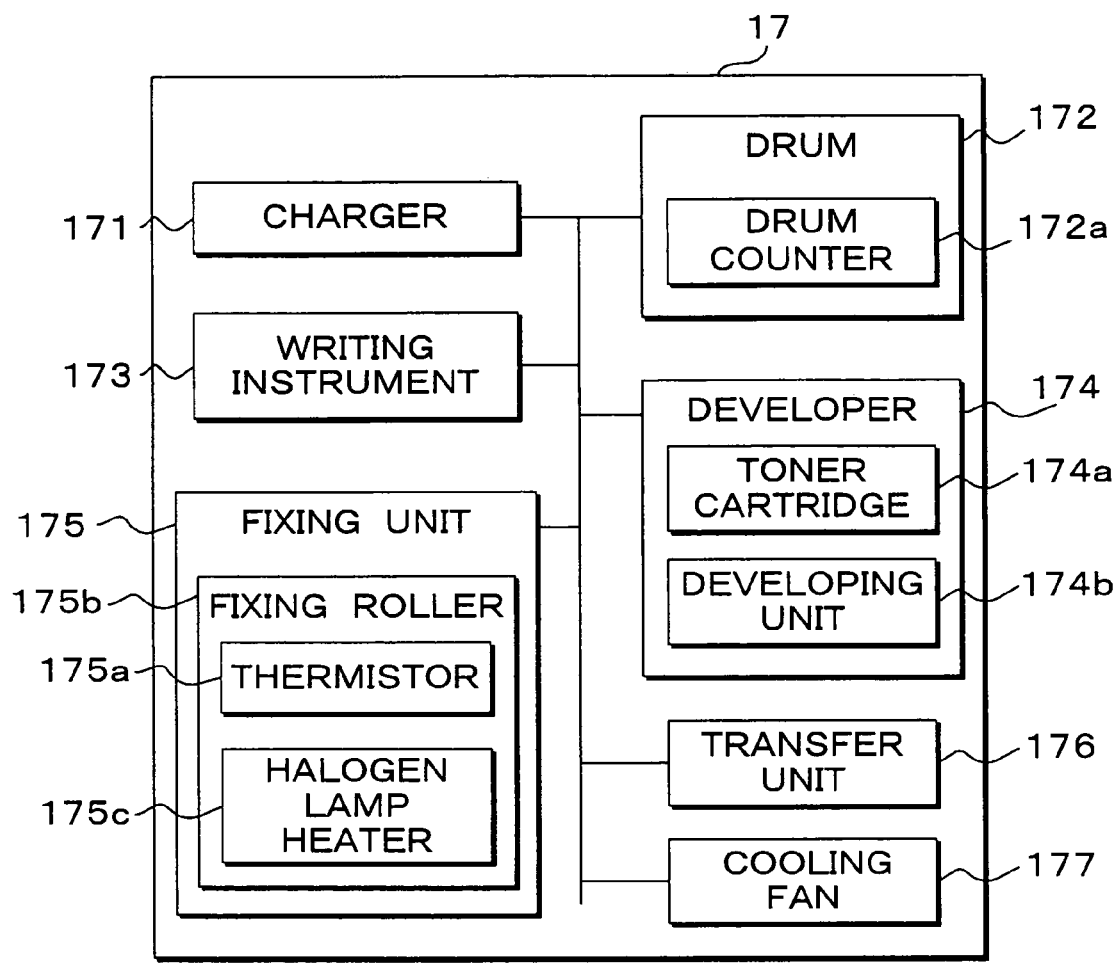
FIG. 5 is a block diagram showing a main structure of an image forming unit.

FIG. 5 is a block diagram showing a main structure of the image forming unit 17. The image forming unit 17 carries out image formation in accordance with image data outputted by the image processing unit 15. Therefore, the image forming unit 17 arranges several parts (operation units): a drum 172; a charger 171 to charge the drum 172 at a predetermined potential; a writing instrument 173 to generate electrostatic latent images onto the drum 172 by emitting laser in accordance with image data received from external devices; a developer 174 to supply toner to the electrostatic latent images generated onto the drum 172; a transfer unit 176 to transfer, onto papers, the toner images generated on the drum 172; a fixing unit 175 to fix the transferred toner images on the papers with heating, and the like. The image forming unit 17 forms images required by the users on papers, in an electrographic manner.

The drum 172 arranges a drum counter 172a to detect a history of application (cumulative number of rotations) for the drum 172. The drum counter 172a counts the number of rotations (running distance corresponding to drum rotation) of the drum 172, for example, with an infrared sensor. Therefore, an administrator can replace the drum 172 quickly through predictions about the replacement timing by detecting the history of application.

In addition, the fixing unit 175 arranges a fixing roller 175b that may use a halogen lamp heater 175c. A temperature of the halogen lamp heater 175c (operating situation) can be detected, for example, by providing thermistor 175a to the fixing roller 175b. Furthermore, the temperature of the halogen lamp heater 175c can be controlled by adjusting conductions toward the halogen lamp heater 175c in response to the detected results of the temperature or instructions from the remote control 2. The developer 174 arranges a developing unit 174b to form visible images on the drum 172 by using toner and a toner cartridge 174*a* containing supplemental toner. The toner cartridge 174*a* supplies the same amount of toner as those used by the developing unit 174*b*, to the developing unit 174*b*. The image forming unit 17 further arranges detectors (not shown) to detect numbers of printed paper, remaining amount of toner, and the like. Generally, the toner cartridge 174*a* is replaced in a shorter period of time than the developing unit 174*b*, because of the limited life.

Thus, the administrator can recognize a history of application (cumulative number of rotations) of the drum 172 and access the temperature (operating situation) of the halogen lamp heater 175*c* of the fixing unit 175, by handling the remote control 2. In other words, the administrator can recognize them even at a location far away from the digital multi-function machine. Therefore, these configurations lead advantages that the administrator can take the recognition and the access without interruption of users, even when the users are utilizing the digital multi-function machine. In addition, the digital multi-function machine arranges a cooling fan 177 to prevent temperature rise of the main body 1 due to the fixing unit 175.

The communicating unit 18 has an IP address, ID, and the like, to communicate in a wireless manner with another communicating unit 24 of the remote control 2 in one-to-one correspondence manner. The communicating unit 18 sends data, such as operating situation or history of application for the parts described above, to the communicating unit 24 of the remote control 2, in response to instructions accepted through the remote control 2. In addition, if instructions are accepted through a control panel 21 of the remote control 2 for the recognition of histories of application according to the parts described above or the access to data relating to instructions for operations (data corresponding to operating situations) or data relating to instructions for setup of the operations (data corresponding to setup of operations), data relating to the instructions accepted through the control panel 21 are received by the communicating unit 24 of the remote control 2.

The paper feeding unit 19 arranges a feeding box that can contain several types of paper to be printed, a picking-up roller that takes singly about contained papers in the feeding box, and the like. Thus, the paper feeding unit 19 takes singly about papers, and sends singly to the image forming unit 17 about the taken papers. The paper feeding unit 19 furthermore arranges a feeding counter that counts, in response to the rotation of the picking-up roller, the number of papers which the picking-up roller sent to the image forming unit 17. Thus, it is possible to recognize paper consumption to detect the history of application (e.g. number of rotations) for the feeding counter. Therefore, the administrator can additionally supply papers-through predictions about the supplying timing by detecting the history of application for the feeding counter.

The CPU 11 can accept instructions through the remote control 2, about the recognitions of the parts' operating situations, the recognitions of other operations or the performance of operations. The CPU 11 obtains responding data for the instructions, from the parts. Then, the CPU 11 can send data in accordance with the responding data, to the remote control 2 via the communicating unit 18. In addition, the CPU 11 can change setups of operations in response to instructions relating to the setups which are accepted through the remote control 2.

Figure 2:
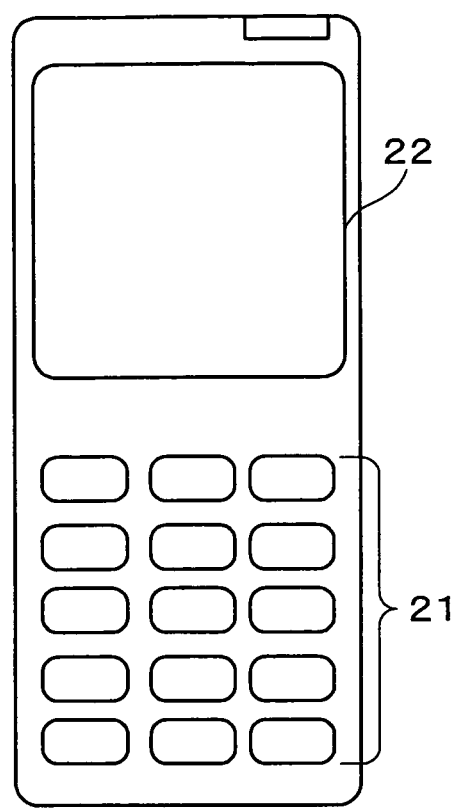
FIG. 2 is a schematic view showing an external appearance of a remote control.

FIG. 2 is a schematic view showing an external appearance of the remote control 2. The remote control 2 arranges: a displaying unit 22; a control panel 21 that accepts instructions by the administrator's handling; a communicating unit 24 that communicates with the communicating unit 18 of the main body 1; and a storing unit 23 that stores data which have been received and sent by the communicating unit 24.

The control panel 21 arranges hard keys handled by the administrator. Through administrator's handling of the hard keys, the remote control 2 accepts instructions about the recognitions of the parts operating situations, the recognitions of other operations/the performance of operations (data corresponding to operating situations) or the access the setup of operations (data corresponding to setup of operations). For example, the administrator can recognize histories of application for the drum counter, the counter of remaining amount of toner, a developer consumption counter, and the like, through handling the control panel 21. Furthermore, the administrator can reset or modify the histories of application, after maintenance, such as replacement of the parts. Moreover, the administrator can change setups for print operation, such as margin, line pitch, resolution of print engine, image density, or the like. It should be noted that the digital multi-function machine is allowed to accept the instructions about the recognitions of the operating situations, the instructions relating to the recognition and control of operations, and the instructions relating to the setup, only through the control panel 21, but not through the control panel 16. Therefore, the digital multi-function machine according to the Embodiment 1 leads advantages to prevent unauthorized access of users having unfair purposes in advance, with the administrator carrying the remote control 2, even if the digital multi-function machine is in rental.

The communicating unit 24 has an IP address, ID, and the like, to communicate in a wireless manner with another communicating unit 18 of the main body 1 in one-to-one correspondence manner. The communicating unit 24 sends data, such as information for operating situations, history of application for the parts described above or setups of operations, to the communicating unit 18 of the main body 1, in response to instructions accepted through the control panel 21. In addition, the communicating unit 24 receives data from the communicating unit 18 of the main body 1, for example, for operating situations of the parts described above.

The storing unit 23 consists of non-volatile semiconductor memory whose storing area is partially utilized for a sent data table storing sent data and a received data table storing received data. For example, the received data table stores data relating to the operating situations of the parts described above that have been received through the communicating unit 18 of the main body 1, and the sent data table stores data relating to the recognition of the operating situations of the parts described above, data relating to the recognition and control of operations, or data relating to instructions for setups of operations that have been sent to the communicating unit 18 of the main body 1. FIG. 3 is a schematic view showing one example of the received data table. FIG. 4 is a schematic view showing one example of the sent data table. The received data table in FIG. 3 stores counted values by the drum counter (cumulative number of rotations), counted values by the feeding counter (history of application), and temperatures of the halogen lamp heater (operating situation). Both of the counted values and temperature are associated with the date, respectively. Therefore, these configurations lead advantages that the administrator can perform maintenance quickly while recognizing the present histories of application and the present operating situations for several parts through the received data table on the displaying unit 22. The sent data table in FIG. 4 stores image densities (setup for operation), resolutions of print engine (setup for operation), and temperatures of the halogen lamp heater (operating situation). The image densities, resolutions and the temperatures are associated with the date, respectively. Therefore, these configurations lead advantages that the administrator can change/adjust setups for operations and operating situations during maintenance, while recognizing the present setups for operations and the present operating situations for several parts through the sent data table on the displaying unit 22.

The displaying unit 22 consists of, for example, liquid crystal display;, and displays several data, such as data accepted through the control panel 21, data stored in the storing unit 23, data of the sent data table, data of the received data table, and the like. Therefore, these configurations lead advantages that the administrator can properly maintain the digital multi-function machine while utilizing the operating situations of the parts described above as a history of maintenance.

In other words, the digital multi-function machine in accordance with the Embodiment 1 accepts the instructions for copy operation, print operation, facsimile operation, and the like, through the control panel 16 (first accepting unit). On the other hand, the digital multi-function machine according to the Embodiment 1 accepts the instructions for the recognition of the operating situations (for example, temperature of halogen lamp heater) relating parts that synchronize in response to the operation, such as drum, toner cartridge, halogen lamp heater of fixing unit, and the like, or the history of application (for example, cumulative rotation number for drum), the instructions for the recognition and control of operations, and the instructions for setup (margin for print operation, line pitch, resolution of print engine, image density, or the like), only through the remote control 2 (second accepting unit).

Figure 6:
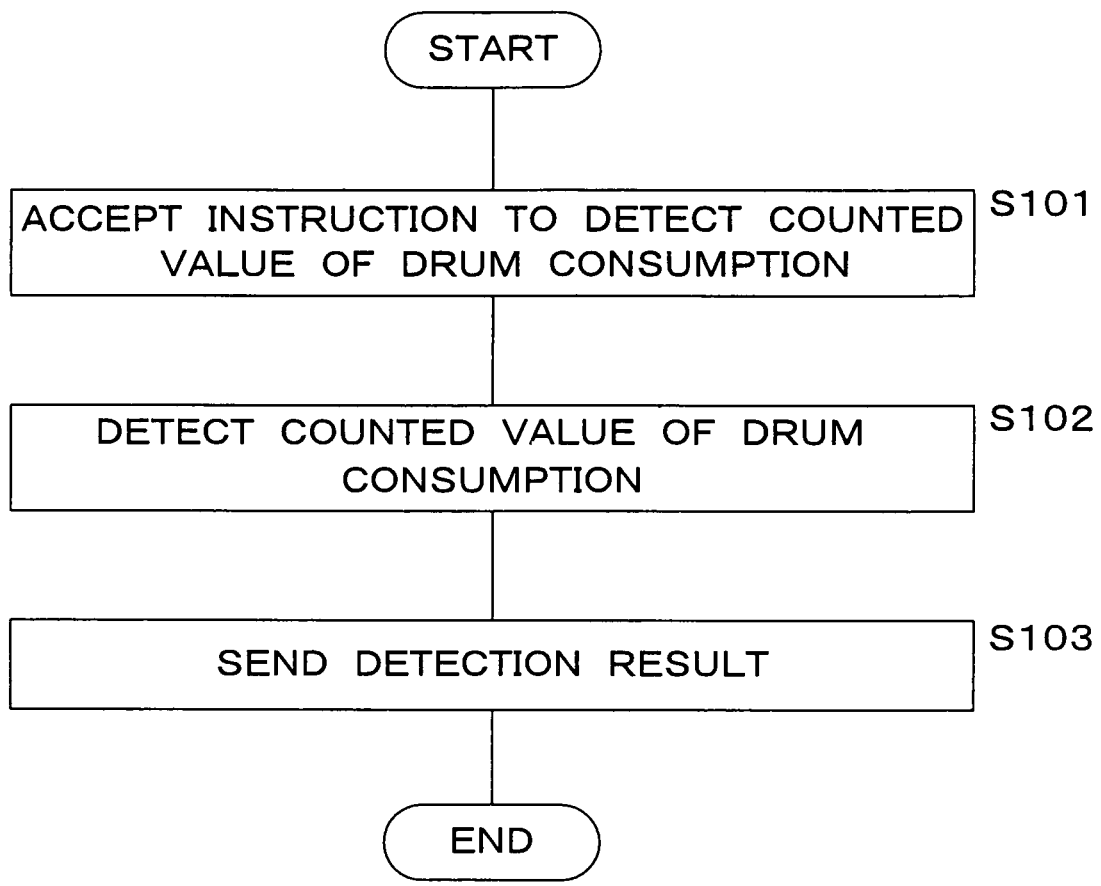
FIG. 6 is a flowchart showing one example of procedure controlled by a CPU of the digital multi-function machine in accordance with an embodiment 1 of the present invention.

FIG. 6 is a flowchart showing one example of procedure controlled by the CPU 11 of the digital multi-function machine in accordance with the Embodiment 1. It should be noted that the present invention is described hereinafter in the context of the case to detect counted values of drum consumption (history of application), as one example of the case that instructions from the administrator are accepted to recognize histories of application for the parts, for illustration purposes.

The CPU 11 accepts the instruction to detect counted values of drum consumption, if the administrator has handled the control panel 21 of the remote control 2 to recognize counted values of drum consumption (S 101). The communicating unit 24 of the remote control 2 sends data for the instruction about the recognition accepted through the control panel 21 of the remote control 2, to the communicating unit 18 of the main body 1. The communicating unit 18 of the main body 1 then sends the instruction about the recognition, to the CPU 11.

The CPU 11 detects the counted values of drum consumption, if having received the instruction about the recognition from the communicating unit 24 of the remote control 2 (S 102). In other words, the CPU 11 obtains the counted values of drum consumption from the drum counter 172a, and temporally stores the counted values in RAM 14.

The CPU 11 then sends detection results to the remote control 2 (S 103). In other words, the detection results temporally stored in the RAM 14 (the counted values of drum consumption) are sent to the communicating unit 24 of the remote control 2 via the communicating unit 18.

The counted values of drum consumption are received through the communicating unit 24 of the remote control 2, and then stored in the storing unit 23. As described above, the counted values of drum consumption are associated with the date, in the received data table of the storing unit 23. Thus, it is possible to utilize the counted values of drum consumption as the history of application for later maintenance.

After having been stored in the storing unit 23, the counted values of drum consumption are displayed on the displaying unit 22 of the remote control 2. The administrator can recognize operating situations of the drum through the counted values of drum consumption displayed on the displaying unit 22.

Next, the present invention is described in the context of the case to reset the counted values of drum consumption after replacement of the drum to a new drum in the digital multi-function machine according to the present invention, as one example of the case that instructions from the administrator are accepted to control the histories of application for the parts, for illustration purposes.

The CPU 11 accepts the instruction to reset the counted values of drum consumption, through the administrator's handling of the control panel 21 of the remote control 2 after replacement of the drum to a new drum in the digital multi-function machine. Specially, the communicating unit 24 of the remote control 2 sends data relating to the instructions accepted through the control panel 21 of the remote control 2 about the control of the histories of application, to the communicating unit 18 of the main body 1. The communicating unit 18 of the main body 1 then sends the instruction about the control, to the CPU 11. The CPU 11 makes the drum counter 172a reset the counted values of drum consumption to be "0".

The data relating to the instructions about the control, which are sent to the communicating unit 18 of the main body 1 through the communicating unit 24 of the remote control 2, are stored in the storing unit 23 of the remote control 2. In other words, the data to reset the counted values of drum consumption are sent to the communicating unit 18 of the main body 1 through the communicating unit 24 of the remote control 2, and then associated with the date in the sent data table of the storing unit 23, as described above. For example, "0" is written in the sent data table of the storing unit 23, as the counted values of drum consumption. Therefore, these configurations lead advantages to facilitate the administrator properly maintaining the digital multi-function machine with the use of the information in the sent data table for later maintenance.

Figure 7:
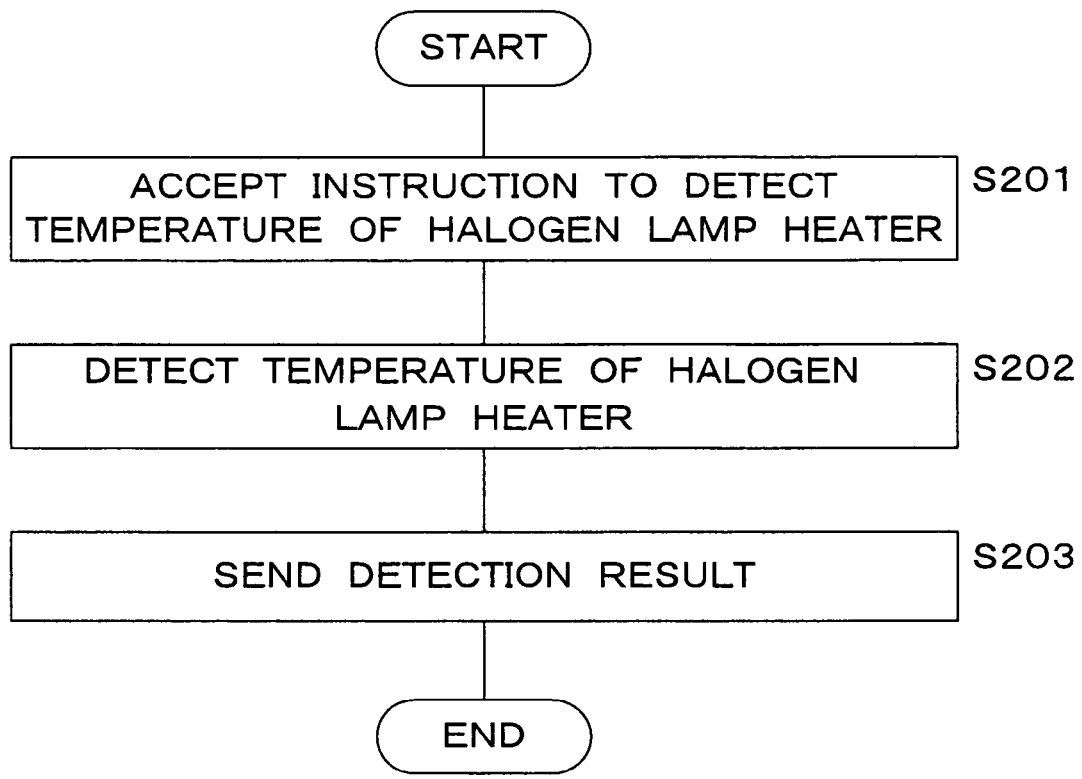
FIG. 7 is a flowchart showing another example of procedure controlled by a CPU of the digital multi-function machine in accordance with an embodiment 1 of the present invention.

FIG. 7 is a flowchart showing another example of procedure controlled by the CPU 11 of the digital multi-function machine in accordance with the Embodiment 1. It should be noted that the present invention is described hereinafter in the context of the case to detect temperatures of the halogen lamp heater 175c of the fixing unit 175 (operating situation), as one example of the case that instructions from the administrator are accepted to recognize operating situations for the parts or to recognize operations, for illustration purposes.

The CPU 11 accepts the instruction to detect the temperatures of the halogen lamp heater 175c, if the administrator has handled the control panel 21 of the remote control 2 to recognize the temperatures of the halogen lamp heater 175c (S 201). The communicating unit 24 of the remote control 2 sends data for the instruction about the detection accepted through the control panel 21 of the remote control 2, to the communicating unit 18 of the main body 1. The communicating unit 18 of the main body 1 then sends the data about the detection, to the CPU 11.

The CPU 11 detects the temperatures of the halogen lamp heater 175c, if having received the instruction about the detection from the communicating unit 18 of the main body 1 (S 202). In other words, the CPU 11 obtains the temperatures of the halogen lamp heater 175c from the thermistor 175a, and temporally stores the temperatures of the halogen lamp heater 175c in the RAM 14.

The CPU 11 then sends detection results to the remote control 2 (S 203). In other words, the detection results temporally stored in the RAM 14 (the temperatures of the halogen lamp heater 175c) are sent to the communicating unit 24 of the remote control 2.

The temperatures of the halogen lamp heater 175c are received through the communicating unit 24 of the remote control 2, and then stored in the storing unit 23. As described above, the temperatures of the halogen lamp heater 175c are associated with the date, in the received data table of the storing unit 23. Thus, it is possible to utilize the temperatures of the halogen lamp heater 175c as the history of application for later maintenance.

After having been stored in the storing unit 23, the temperatures of the halogen lamp heater 175c are displayed on the displaying unit 22 of the remote control 2. The administrator can recognize the temperatures of the halogen lamp heater 175c (operating situations) through the displaying unit 22.

Next, the present invention is described in the context of the case to control the temperature of the halogen lamp heater 175c of the fixing unit 175 in the digital multi-function machine according to the present invention, as one example of the case that instructions from the administrator are accepted to access/control the operating situations for the parts, for illustration purposes.

The CPU 11 accepts the instruction to control the temperature of the halogen lamp heater 175c in a predetermined temperature, through the administrator's handling of the control panel 21 of the remote control 2. Specially, the communicating unit 24 of the remote control 2 sends data relating to the instructions accepted through the control panel 21 of the remote control 2 about the control of the temperature of the halogen lamp heater 175c, to the communicating unit 18 of the main body 1. The communicating unit 18 of the main body 1 then sends the data about the control, to the CPU 11.

The CPU 11 performs on/off processes of conductions toward the halogen lamp heater 175c of the fixing unit 175 in accordance with the detection results of the thermistor 175a, if having received the data about the control of the temperature of the halogen lamp heater 175c. Thus, the temperature of the halogen lamp heater 175c is controlled to become the predetermined temperature, by continuing the on/off processes until the temperature of the halogen lamp heater 175c becomes the predetermined temperature.

The data relating to the data about the control, which are sent to the communicating unit 18 of the main body 1 through the communicating unit 24 of the remote control 2, are stored in the storing unit 23 of the remote control 2. In other words, the data to control the temperature of the halogen lamp heater 175c are sent to the communicating unit 18 of the main body 1 through the communicating unit 24 of the remote control 2, and then associated with the date in the sent data table of the storing unit 23, as described above. For example, the sent data table of the storing unit 23 keeps the predetermined temperature as the temperature of the halogen lamp heater 175c at the associated date. Therefore, these configurations lead advantages to facilitate administrator properly maintaining the digital multi-function machine with the use of the information in the sent data table for later maintenance.

(Embodiment 2)

In the following, it will be explained about an electric system according to another aspect of the present invention on the basis of drawings showing embodiments thereof, in the context of the digital multi-function machine as the electric apparatus.

Figure 8:
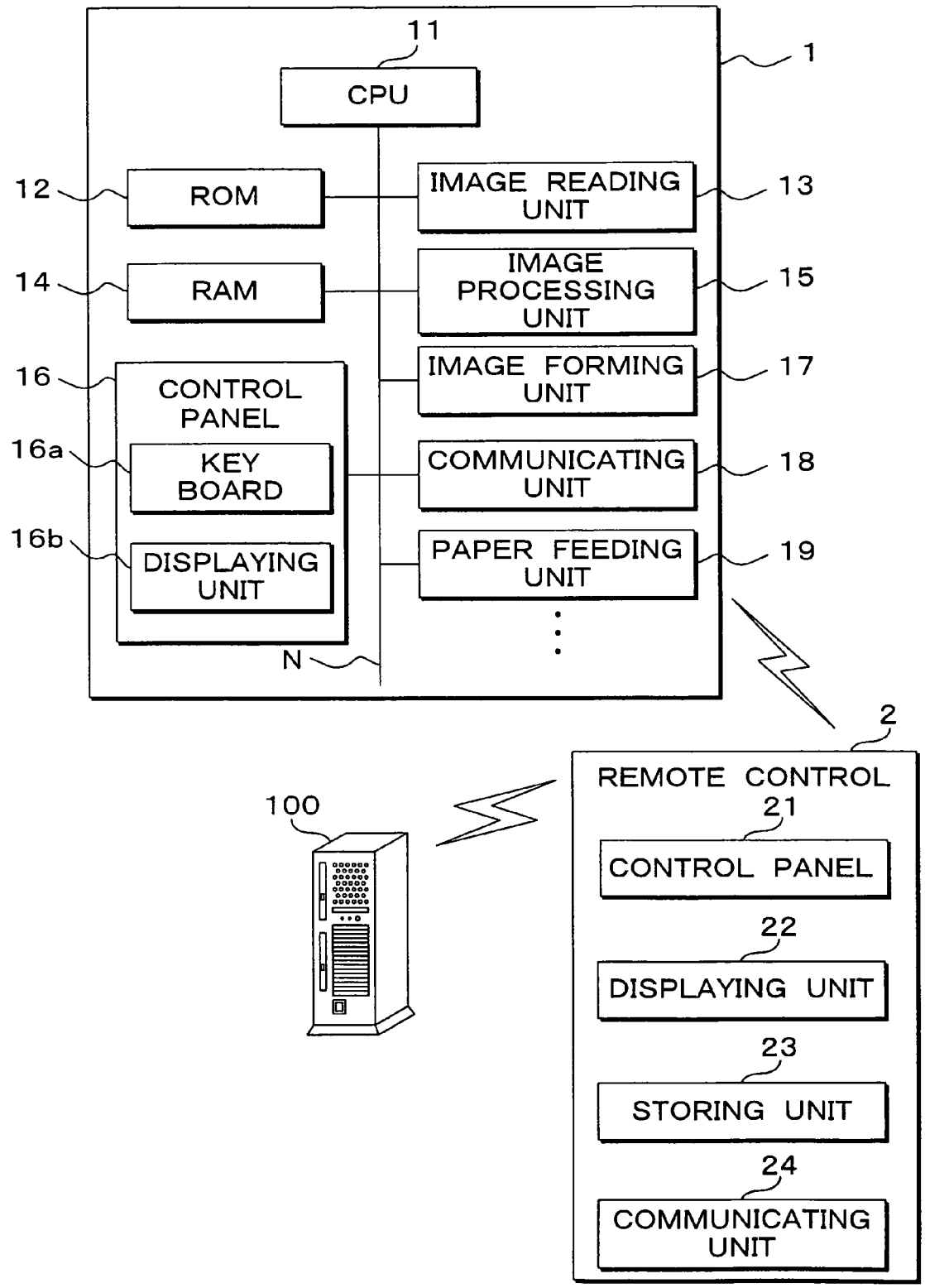
FIG. 8 is a block diagram showing a main structure of an electric system in accordance with an embodiment of the present invention.

FIG. 8 is a block diagram showing a main structure of an electric system in accordance with the present invention. The electric system in accordance with the present invention arranges the main body 1, the remote control 2 (second accepting unit) and a data storage device 100. The remote control 2 controls the main body 1 remotely, and the data storage device 100 stores data received from the remote control 2.

The main body 1 arranges the CPU 11 and plural hardware, such as the ROM 12, the RAM 14, the control panel 16 (first accepting unit), the image reading unit 13, the communicating unit 18, the image processing unit 15, the image forming unit 17, the paper feeding unit 19, and the like. The plural hardware is connected to the CPU 11 via the bus N.

Figure 9:
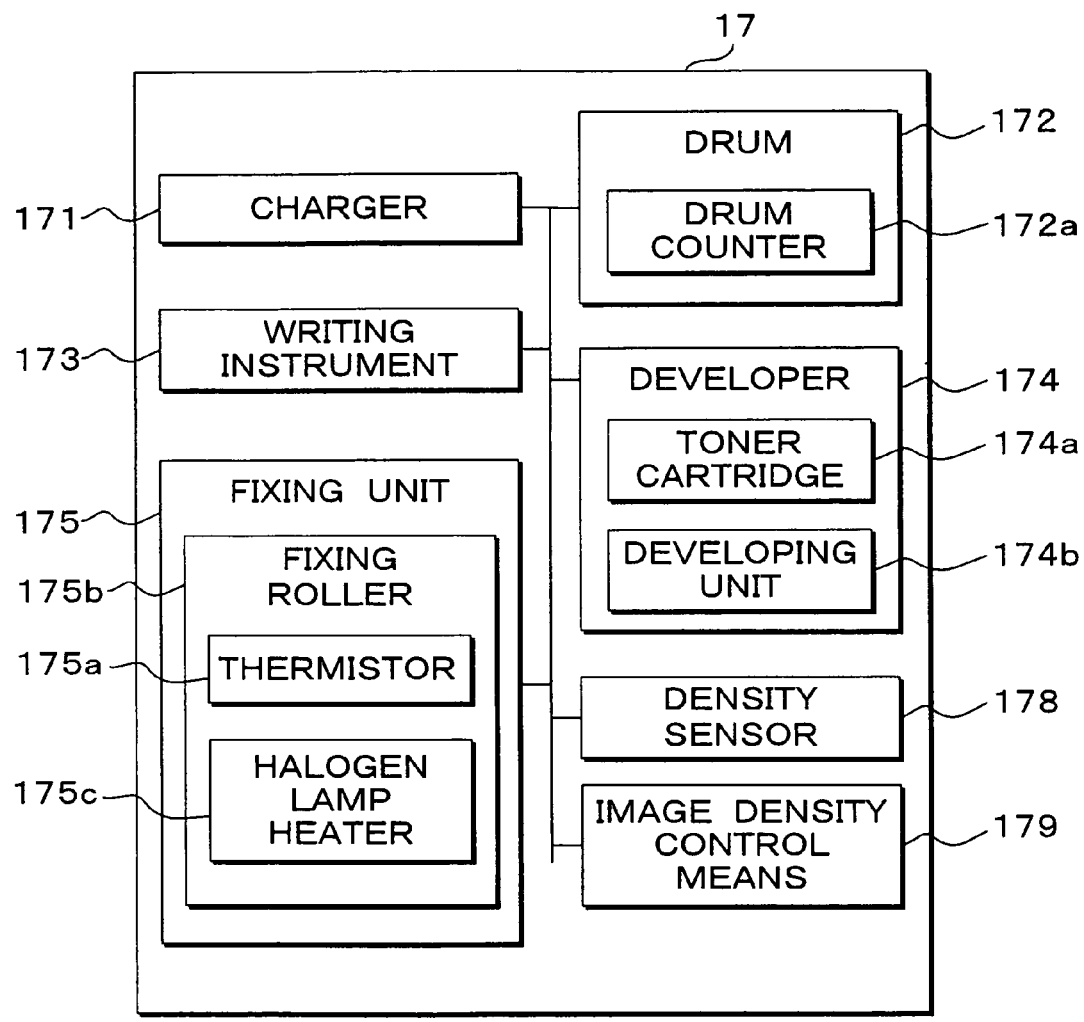
FIG. 9 is a block diagram showing one illustrative main structure of the image forming unit.

FIG. 9 is a block diagram showing one illustrative main structure of the image forming unit 17. The image forming unit 17 arranges several parts (operation units): the drum 172; the charger 171; the writing instrument 173; the developer 174; the fixing unit 175, and the like, and carries out image formation on papers in accordance with image data outputted by the image processing unit 15.

The image forming unit 17 further arranges a density sensor 178 that detects image density of the carried image formation and an image density control means 179 that changes toner density to control the image density, for example with adjustment of developing electric potential.

The data storage device 100 is configured from; a database; a data processing unit; and a communication unit, such as modem, local area computing-network, or the like. The data storage device 100 further receives data from the remote control 2, and associates the received data in the database with the date. Furthermore, the data storage device 100 can send data in the database to the remote control 2. It should be noted that, if there are several remote controls 2, 2, ..., the data storage device 100 may be configured to store the received data associated with the sender, i.e. each remote control 2.

The present invention is described hereinafter in the context of the case to access/control a setup for the image density of the digital multi-function machine in accordance with the present invention, as one example of the case that instructions from the administrator are accepted to access/control a setup for the operations, for illustration purposes.

The CPU 11 accepts the instruction to control the setup for the image density in a predetermined setup for the image density, through the administrator's handling of the control panel 21 of the remote control 2. Specially, the communicating unit 24 of the remote control 2 sends data relating to the instructions accepted through the control panel 21 of the remote control 2 about the control of the setup for the image density, to the communicating unit 18 of the main body 1. The communicating unit 18 of the main body 1 then sends the data about the control, to the CPU 11.

The CPU 11 controls the image density control means 179 to change the image density into a predetermined value in accordance with the detection results of the density sensor 178, if having received the data about the control of the setup for the image density. The image density control means 179 then changes toner density to control the image density into the predetermined value with adjustment of developing electric potential.

The data relating to the instructions about the control of the setup for the image density, which are accepted through the control panel 21 of the remote control 2, are stored in the storing unit 23 of the remote control 2. In other words, the data to control the setup for the image density, which are accepted through the control panel 21 of the remote control 2 and sent to the communicating unit 18 of the main body 1 through the communicating unit 24, are associated with the date in the sent data table of the storing unit 23, as described above. For example, if the instruction about the control of the setup for the image density represents "α" as the predetermined value that has been accepted through the control panel 21, the sent data table of the storing unit 23 keeps "α" as the image density at the associated date. Therefore, these configurations lead advantages to facilitate the administrator properly maintaining the digital multi-function machine with the use of the information in the sent data table for later maintenance.

Then, the CPU 11 may accept instructions to send data stored in the storing unit 23 to the data storage device 100. These instructions may be accepted through the control panel 21 of the remote control 2 from the administrator or through the communicating unit 24 of the remote control 2 from the data storage device 100. The CPU 11 sends the data stored in the storing unit 23 to the data storage device 100 via the communicating unit 24 of the remote control 2, if having received the instruction to send data stored in the storing unit 23. The data are then received by the data storage device 100 and associated in the database with the received date.

The data storage device 100 stores the received data associated with the sender, i.e. each remote control 2, in the case that there are several remote controls 2, 2, . . . , as described above. Therefore, these configurations lead advantages to make integrated management of data for the plural digital multi-function machines. For example, a company to rent plural of the digital multi-function machines does not need to ask information, such as reports written on documents, for each digital multi-function machine to each administrator. In other words, it is sufficient for the company only to manage the database of the data storage device 100, instead of asking such information to each administrator. Therefore, these configurations lead further advantages to prevent mistakes that occur very often in reports written on documents, such as omissions and errors.

Furthermore, the data storage device 100 can send data stored in the database to the remote control 2, in response to instructions of the administrator via e.g. the communication unit. The data sent to the remote control 2 are displayed on the displaying unit 22. Therefore, it is possible to prepare for the case that the remote control 2 loses data in the storing unit 23 by any cause.

Some configurations and advantages of the Embodiment 2 are described above. Other configurations that are the same as those of the Embodiment 1 are given the identical numerals to the Embodiment 1 and, accordingly, those other configurations and other advantages will not be described in detail.

In the Embodiment 1 and the Embodiment 2, the present invention is described in the context of the counted values of drum consumption as the history of application for parts, and the temperature of the halogen lamp heater of the fixing unit as the operating situations for parts, for illustration purposes. However, it should be noted that the present invention is not limited to these configurations described above.

(Embodiment 3)

Hereinafter, the electric apparatus and the electric system in accordance with the present invention are described in the context of handling the remote control 2 by maintenance personnel who perform maintenance of the digital multi-function machine which has been rented for services. In the following description, it is assumed that one remote control 2 manages several digital multi-function machines (several main bodies 1) located on several places.

Each digital multi-function machine (electric apparatus) in accordance with the Embodiment 3 arranges the main body 1 having the storing unit. The storing unit stores so-called history that associates the date with several data, such as data sent to the remote control 2, data received from the remote control 2, data relating to the operations, and the like. The main body 1 arranges several counters, such as a print counter that counts total numbers of printed papers, a feeding tray counter that represents indicator for replacement of a feeding roller, a developer consumption counter that counts the consumed amount of developer, and the like. The data storage device 100 stores data received from several main bodys 1. In addition, the data storage device 100 is configured to store the received data within several databases on the basis of the sender, i.e. each main body 1 that has sent data corresponding to the received data. Some configurations of the electric system in accordance with the Embodiment 3 are described above. Other configurations that are the same as those of the Embodiment 2 are given the identical numerals to the Embodiment 2 and, accordingly, those other configurations and the same advantages will not be described in detail.

The maintenance personnel handles the remote control 2 to record data, which are stored in the storing unit and relate to the operations of each digital multi-function machine, in the remote control 2; such as operation situation, trouble information, maintenance history, life of consumable parts, remaining amounts, and the like. Furthermore, the maintenance personnel can recognize the recorded data through displays on the displaying unit 22 of the remote control 2. Then, the maintenance personnel can give new instructions to each digital multi-function machine and carries out the control of the setups, by handling the control panel 21.

It is possible to prevent incorrect setups by third party and operations for unfair purposes, by allowing only the remote control 2 to access operation situations and setup information of each digital multi-function machine.

For example, the maintenance personnel handles the remote control 2 to recognize total numbers of printed papers through detection results of the print counter, in the case of accounting. For example, the maintenance personnel handles the remote control 2 to recognize the indicator for replacement of the feeding roller through detection results of the feeding tray counter, in the case of carrying out maintenance. The maintenance personnel may handle the remote control 2 to reset the feeding tray counter to be "0" for the future maintenance, after the replacement of the feeding roller. For example, the maintenance personnel handles the remote control 2 to recognize the consumed amount of developer through detection results of the developer consumption counter, in the case of carrying out maintenance. The maintenance personnel can predict replacement timing of the developer. Thus, the maintenance personnel can adjust toner density through proper replacement of the developer. The maintenance personnel may handle the remote control 2 to reset the developer consumption counter to be "0" for the future maintenance, after the adjustment of the toner density.

The digital multi-function machine in accordance with the present invention is configured to prohibit accepting such instructions described above from the control panel 16 arranged to the main body 1, which can be handled by users. Instead of the control panel 16, only the remote control 2 is allowed to send such instructions to be accepted by the digital multi-function machine. In conventional digital multi-function machines, such instructions described above are accepted even through the control panel 16. Thus, it is known that some users reset (or clear) the print counter for unfair purposes, the accounting is calculated by lesser number of printed papers than actual number of the printed papers, and then the reset hurts a renter of the conventional digital multi-function machines. The digital multi-function machine (electric apparatus and electric system) in accordance with the present invention can prevent unfair access by the users described above, because such instructions described above are accepted only through the remote control 2.

In addition, the remote control 2 can store the history of accepted instructions in the storing unit 23. Thus, it is possible to report properly what the maintenance personnel has carried out, because such instructions described above are stored. For the conventional digital multi-function machine, the maintenance personnel sees the detection results of the account counter through displays on the displaying unit 16b of the conventional digital-function machine (or through papers printed the counted values of the account counter, by one of functions of the conventional digital multi-function machine), and needs to fill information corresponding to the detection results by hand on documents, such as reports, accounting sheets, or the like. Therefore, these conventional configurations have disadvantages that-mistakes occur very often, such as omissions and errors, because of filling such information by hand.

The remote control 2 of the electric system in accordance with the present invention is configured to store sent and received data or history of sending and receiving, in the storing unit 23. Thus, the storing unit 23 can correctly store what the maintenance personnel has carried out. Therefore, it is possible to correctly manage a service history such as maintenance information of the digital multi-function machine, a past trouble history, a job situation such as job management of the maintenance personnel (to check the presence of uncompleted job), and the like.

In addition, such information described above can be stored as a history, in the remote control 2. Then, the maintenance personnel can see information corresponding to the history stored in the remote control 2, through displays on the displaying unit 22, for maintenance. In other word, the maintenance personnel can see not only the latest maintenance information, but also all the previous maintenance information. These configurations lead advantages to improve services. In addition, data stored in the remote control 2 can be uploaded to the database of the data storage device 100. Therefore, these configurations lead advantages to make integrated management of data/informational for the plural digital multi-function machines.

Further, the remote control 2 is configured to carry out wireless communication with the main body 1 of the digital multi-function machine. Thus, the remote control 2 can receive data relating to the operations, even during the time when the users are utilizing the digital multi-function machine. These configurations lead advantages to avoid interruption of users and to facilitate the maintenance. In other words, users do not need to stop the utilization of the digital multi-function machine, even when the remote control 2 receives data relating to the operations.

In the Embodiment 3, the present invention is described in the context of the recognition of the detection results with the counted values (operating situations or the like) of the counters and the reset of the counters, for illustration purposes. It should be noted that the present invention is not limited to such configurations. Specially, the digital multi-function machine can arrange several counters for accounting, managing maintenance and the like: such as the print counter; use counters for each operation (copying, facsimileing, printing, and the like); a maintenance counter; the feeding tray counters; the developer consumption counter; the drum counter, and the like. These counters are configured to detect the counted values and reset the counted values, in response to the instructions through the remote control 2.

In the Embodiment 3, the present invention is described in the context of instructions through the remote control 2 by the maintenance personnel. It should be noted that the present invention is not limited to such configurations. For example, the digital multi-function machine may accept instructions for better image, only through the remote control 2, to access the setups for several processes, such as sensing photo, developing, transferring, fixing, and the like. These configurations lead advantages to prevent users from giving instructions of incorrect setups.

Hereinafter, the present invention is described in the context of the instructions of the maintenance personnel through the remote control 2, on the basis of drawings showing embodiments thereof. FIG. 10 is a schematic view showing several examples displayed on the displaying unit 22 in response to the remote control 2 handled by the maintenance personnel.

The remote control 2 asks for a code name and a password of operator to prevent improper usage, if the maintenance personnel has turned on the remote control 2. Thus, entry fields of the code name and the password are displayed on the display unit 22 (FIG. 10A). The maintenance personnel can fill own code name and password. The remote control 2 becomes operable if authentication according to the code name and password has succeeded. On the other hand, the remote control 2 becomes inoperable for the next operation, if the authentication has failed. The remote control 2 may become inoperable during a predetermined period, if the authentication has failed several times.

The remote control 2 then displays screen to select operations on the displaying unit 22, as shown in FIG. 10B, if the authentication has succeeded. The screen to select operations arranges soft keys: a "receive, store" soft key to receive data from the main body 1 and store the received data; a "display" soft key to display received data or stored data on the displaying unit 22; and a "send" soft key to send data to the data storage device 100 or the main body 1.

If the maintenance personnel has handled the control panel 21 to select the "receive, store" soft key, the displaying unit 22 displays a screen shown in FIG. 10C. This screen arranges a "setup information" soft key to obtain data relating to the present setup of the main body 1 to be carried out maintenance and a "machine information" soft key to obtain data relating to the history of the main body 1 (FIG. 10D). If the maintenance personnel has handled the control panel 21 to select the "setup information" soft key, the maintenance personnel can obtain several data, such as data relating to the temperature setup of the halogen lamp heater 175c of the fixing roller 175b, data relating to software version of the main body 1. If the maintenance personnel has handled the control panel 21 to select the "machine information" soft key, the maintenance personnel can obtain other data, such as data relating to trouble, data relating to maintenance history, and the like.

If the "setup information" or "machine information" has been selected, the displaying unit 22 displays a screen to select a product type of the main body 1 that is an object of data relating to the setup and data relating to history, i.e. that is carried out maintenance. There are several types of main body 1, depending on the applied functions, such as monochrome function, color function, optional function, and the like. If the maintenance personnel has handled the control panel 21 to select the type of the main body 1 that should be carried out maintenance, the remote control 2 prepares a table that is suitable to display and store data, in the storing unit 23.

The remote control 2 then communicates with the communicating unit 18 of the main body 1, and receives several data stored in the storing unit of the main body 1 via the communicating unit 18. During the case that the remote control 2 is communicating with the communicating unit 18, the remote control 2 keeps displaying information that represents the case. After ending the communication, the remote control 2 displays the screen shown in FIG. 10B on the displaying unit 22, again.

If the remote control 2 has displayed the screen shown in FIG. 10B on the displaying unit 22 after ending the communication, the maintenance personnel can select the "display" soft key to display received data on the displaying unit 22. If the maintenance personnel has handled the control panel 21 to select the "display" soft key, the remote control 2 displays a screen shown in FIG. 10E on the displaying unit 22. This screen arranges soft keys: a "operation situation" soft key to display data relating to operations of the main body 1, such as numbers of total printing, monochrome copying, color copying, scanning, facsimileing, and the like; a "trouble information" soft key to display data relating to trouble of the main body 1, such as numbers of paper jam, paper jam occurred site, frequency of paper jam, communication trouble, and the like; a "maintenance history" soft key to display data relating to maintenance, such as date and contents of previous maintenance, and the like; and a "consumption situation" soft key to display data relating to consumption situation of consumable parts. For example, the maintenance personnel can select the "trouble information" soft key to display data relating to trouble of the main body 1. Then, the maintenance personnel can recognize sites having frequent troubles through the displayed data. Therefore, these configurations lead advantages to facilitate proper management and maintenance. In addition, the displaying unit 22 may be configured to display past maintenance history obtained from the main body 1, as well as data relating to the previous maintenance, if the "maintenance history" soft key has been selected.

For example, if the maintenance personnel has selected the "consumption situation" soft key, the displaying unit 22 displays data relating to consumption situation of each consumable part. Thus, the maintenance personnel can recognize life and remaining amount of each consumable part, and can easily predict replacement timing of each part. If the "consumption situation" soft key has been selected, the displaying unit 22 may display a screen shown in FIG. 10F. This screen represents information converted to numbers of printed papers, such as information of photoreceptor, information of developer, information of toner cartridge, and the like. If the main body 1 is provided to a color digital multi-function machine, such information are converted for each color in the screen.

On the other hand, if the maintenance personnel has handled the control panel 21 to select the "send" soft key on the screen shown in FIG. 10B, the displaying unit 22 displays a screen shown in FIG. 10G. This screen arranges a "send to control device" soft key to send to the data storage device 100 about data received from the storing unit of the main body 1 or data stored in the storing unit 23 of the remote control 2, and a "change setup information" soft key to send to the main body 1 about data relating to e.g. change for temperature of the halogen lamp heater 175c of the fixing roller 175b and data relating to version upgrade for software of the main body 1.

If the maintenance personnel has selected the "send to control device" soft key to send to the data storage device 100 about the data received from the storing unit of the main body 1 or the data stored in the storing unit 23 of the remote control 2, the data received from the main body 1 are sent with an identity number of the main body 1. Therefore, in the present embodiment with plural main bodies 1, 1 . . . , data for each main body 1 are updated in the database for the sender (main body 1 having sent the data). The maintenance personnel or the administrator can recognize total copy numbers per month of the main body 1, trouble information, replacement situation, maintenance situation and the like, while checking the each database for each main body 1. These configurations facilitates the maintenance personnel and the administrator making plans for consumable part procurement, for maintenance policy, and the like. It should be noted that the communication manner for sending data may be wire communication not only wireless communication. In addition, the communication manner may be utilized with cell phones. The communication manner with cell phones becomes possible to add data even between remote locations. Sending data may be carried out at single process for each main body, or for all main bodies. If data for all main bodies are sent at single process, these configurations lead advantages to save communication cost, and the like.

On the other hand, if the maintenance personnel has selected the "change setup information" soft key to send data, such as data relating to version upgrade for software of the main body 1, the data may be sent with or without other data, such as data relating to version upgrade for software of optional parts applied to the main body 1. Such data for optional parts may be related to the setup data already obtained from the main body 1. These data may be sent directly from the data storage device 100 to the main body 1 with wire communication or wireless communication. Alternatively, these data may be stored in the remote control 2 once, and then sent to the main body 1. Additionally, these data may be stored in the remote control 2, in a known manner. For example, the CPU 11 of the main body 1 then receives the data relating to version upgrade for software, and carries out version upgrade operations in accordance with the received data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric apparatus, comprising:
a first acceptance unit that accepts an instruction in predetermined condition;
a main body that carries out an operation in accordance with the accepted instruction; and
a second accepting unit that accepts data corresponding to a setup for operation,
wherein the second accepting unit sends the data corresponding to a setup for the operation to the main body,
wherein the main body carries out the operation, based on the data corresponding to a setup accepted by the second accepting unit, in accordance with the instruction accepted by the first accepting unit, and
wherein the first accepting unit does not accept data corresponding to a setup for the operation in in the predetermined condition.

2. An electric apparatus according to claim 1, wherein the second accepting unit is portable.

3. An electric apparatus according to claim 1, further comprising:

an operation unit that operates in accordance with the operation carried out by the main body, wherein
the main body communicates by radio with the second accepting unit about data corresponding to operating situations of the operation unit.

4. An electric apparatus according to claim 3, wherein
the main body communicates by radio with the second accepting unit about data corresponding to operating situations of the operation unit, regardless of carrying out an operation or not.

5. An electric apparatus according to claim 1, wherein
the second accepting unit comprises:
  a storing unit that stores accepted data; and
  a displaying unit that displays data stored in the storing unit.

6. An electric apparatus according to claim 5, wherein
the storing unit stores data sending history of the second accepting unit.

7. An electric apparatus according to claim 1, wherein
the setup is controlled only by the second accepting unit.

8. An electric apparatus according to claim 1, further comprising:
  an image obtaining unit that obtains image data.

9. An electric apparatus according to claim 1, further comprising:
  an image obtaining unit that obtains image data; and
  a paper feeding unit that feeds paper to form image in accordance with the image data.

10. An electric apparatus according to claim 1, further comprising:
  an image obtaining unit that obtains image data;
  a paper feeding unit that feeds paper to form image in accordance with the image data; and
  an image forming unit that forms image on the paper.

11. An electric system, comprising:
  a first accepting unit that accepts an instruction in a predetermined condition;
  a main body that carries out an operation in accordance with the accepted instruction;
  a second accepting unit that accepts data corresponding to a setup for the operation, wherein the second accepting unit sends the data corresponding to a setup for the operation to the main body,
  wherein
    the main body carries out the operation, based on the setup accepted by the second accepting unit, in accordance with the instruction accepted by the first accepting unit; and
    the first accepting unit does not accept data corresponding to a setup for operation in the predetermined condition;
  an operation unit that operates in accordance with the operation carried out by the main body; and
  a data storage device that stores data, wherein
    the second accepting unit is portable;
    the main body communicates by radio with the second accepting unit about data corresponding to operating situations of the operation unit; and
    the data storage device stores data sent by the second accepting unit.

12. An electric system according to claim 11, wherein
the second accepting unit comprises:
  a storing unit that stores accepted data; and
  a displaying unit that displays data stored in the storing unit.

13. An electric system according to claim 12, wherein
the storing unit stores data sending history of the second accepting unit.

14. An electric system according to claim 11, wherein
the main body communicates by radio with the second accepting unit about data corresponding to operating situations of the operation unit, regardless of carrying out an operation or not.

15. An electric system according to claim 11, wherein
the setup is controlled only by the second accepting unit.

16. An electric system according to claim 11, further comprising:
  an image obtaining unit that obtains image data.

17. An electric system according to claim 11, further comprising:
  an image obtaining unit that obtains image data; and
  a paper feeding unit that feeds paper to form image in accordance with the image data.

18. An electric system according to claim 11, further comprising:
  an image obtaining unit that obtains image data;
  a paper feeding unit that feeds paper to form image in accordance with the image data; and
  an image forming unit that forms image on the paper.

19. An electric system according to claim 11, wherein
the data storage device receives data from the second accepting unit by radio.

* * * * *